United States Patent [19]

Hannon, Jr.

[11] Patent Number: 5,237,675

[45] Date of Patent: Aug. 17, 1993

[54] APPARATUS AND METHOD FOR EFFICIENT ORGANIZATION OF COMPRESSED DATA ON A HARD DISK UTILIZING AN ESTIMATED COMPRESSION FACTOR

[75] Inventor: Francis C. Hannon, Jr., San Jose, Calif.

[73] Assignee: Maxtor Corporation, San Jose, Calif.

[21] Appl. No.: 857,082

[22] Filed: Mar. 19, 1992

Related U.S. Application Data

[63] Continuation of Ser. No. 533,898, Jun. 4, 1990, abandoned.

[51] Int. Cl.[5] .................. G06F 13/00; G06F 3/00; H03M 7/30
[52] U.S. Cl. .................. 395/425; 395/275; 364/DIG. 1; 364/260.6; 364/951.3; 341/95; 341/106
[58] Field of Search .................. 395/425, 275; 364/200 MS File, 900 MS File; 341/95, 106; 382/56; 358/426, 430; 381/31, 32

[56] References Cited

U.S. PATENT DOCUMENTS

| | | | |
|---|---|---|---|
| 4,197,588 | 4/1980 | Cason et al. | 395/425 |
| 4,419,740 | 12/1983 | Hevenor, Jr. | 395/425 |
| 4,467,421 | 8/1984 | White | 395/425 |
| 4,868,570 | 9/1989 | Davis | 341/106 |

*Primary Examiner*—Glenn Gossage
*Attorney, Agent, or Firm*—Blakely, Sokoloff, Taylor & Zafman

[57] ABSTRACT

An embedded controller disk-drive system including a microprocessor features writing and reading of compressed/decompressed data having an arbitrary length to a rigid disk drive in an efficient manner which is transparent to a host of the disk-drive system. A compression factor relating a size of a logical block to the number of bytes stored in a physical sector on the rigid disk is selected and stored in the microprocessor. The data string is compressed, whereupon the microprocessor generates a specialized table containing descriptor field information for each logical block. The descriptor field contains information on a physical block address corresponding to the location of the compressed data string, the length of the compressed data string, and also, for overflow data, linking sector information for linking the compressed data string between two or more physical blocks on the rigid disk.

12 Claims, 5 Drawing Sheets

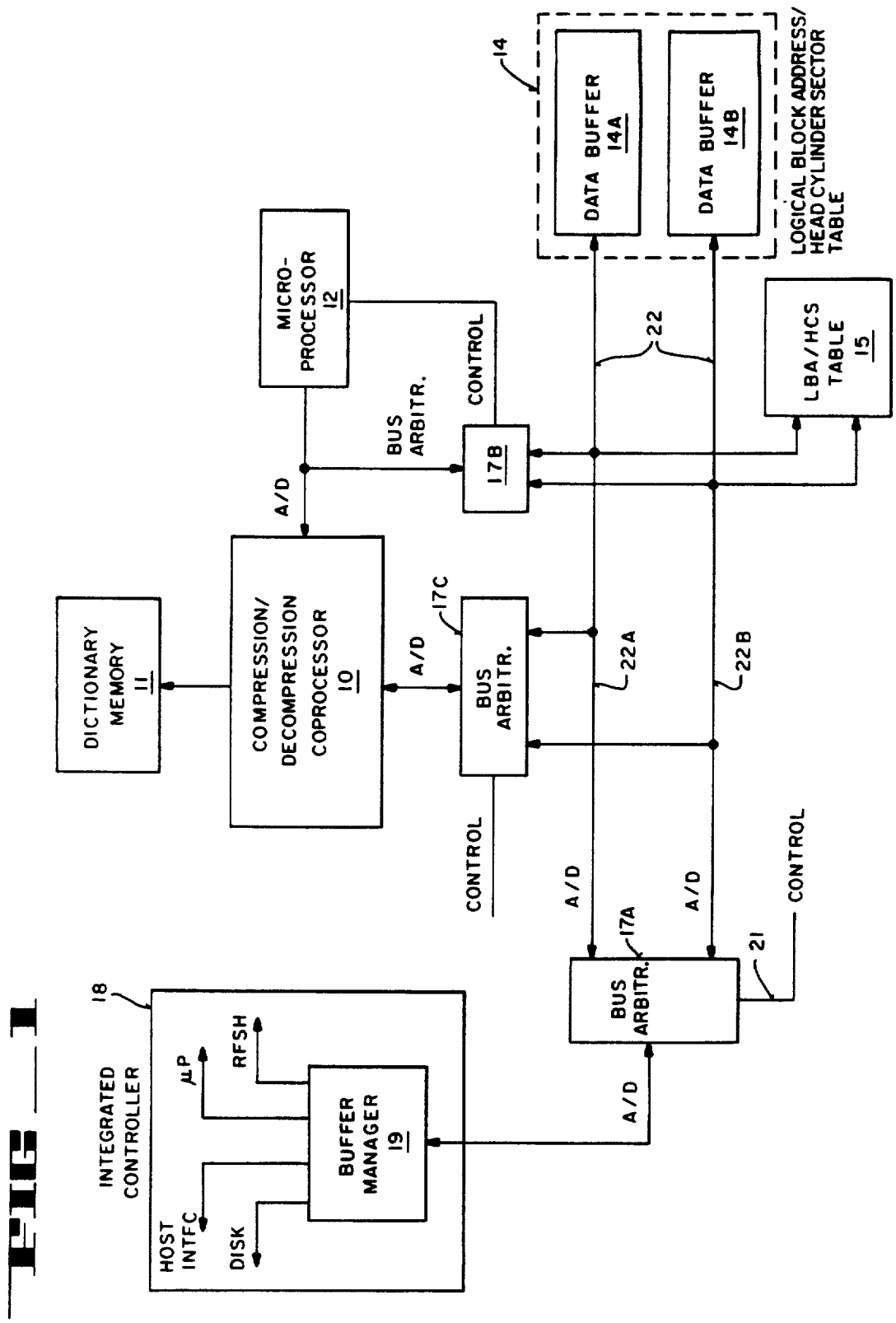
FIG_1

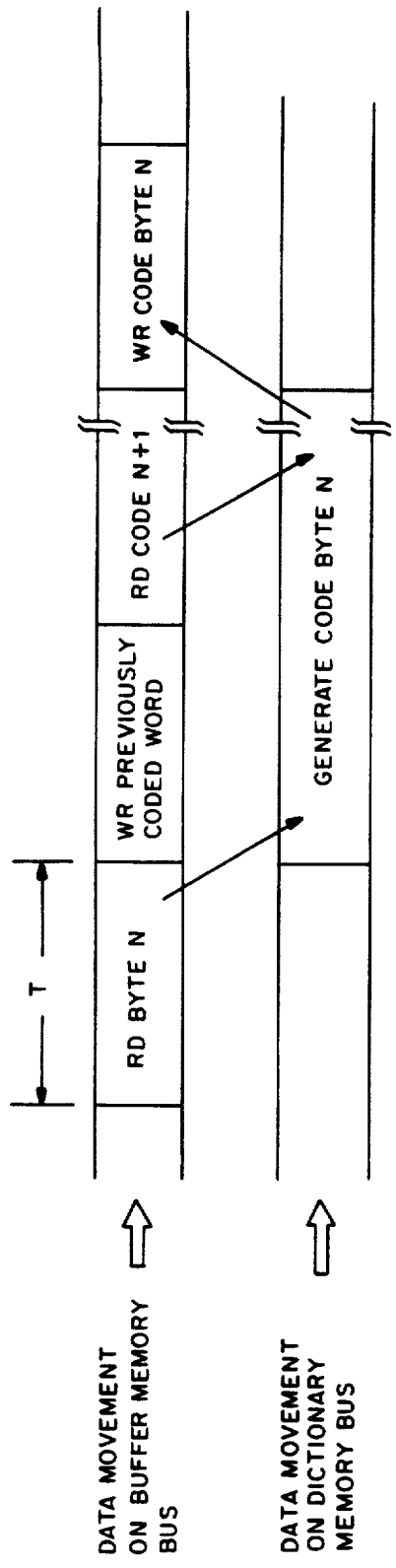
FIG_2
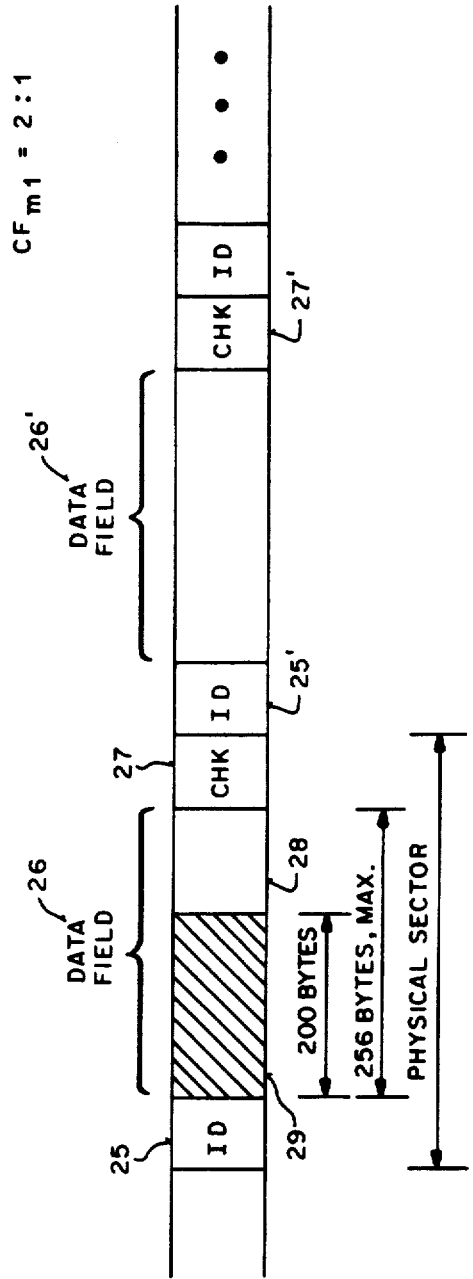
FIG_3

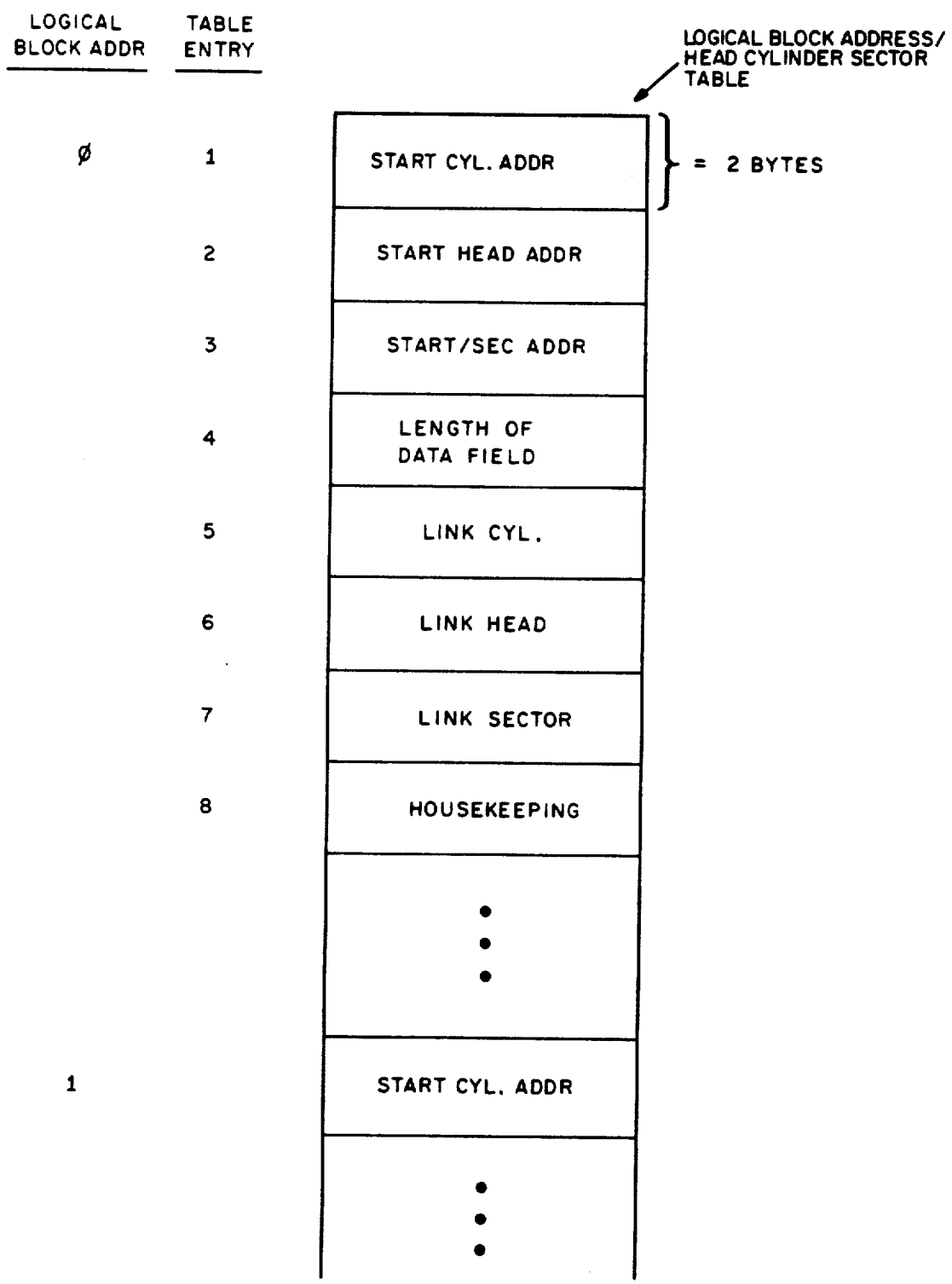

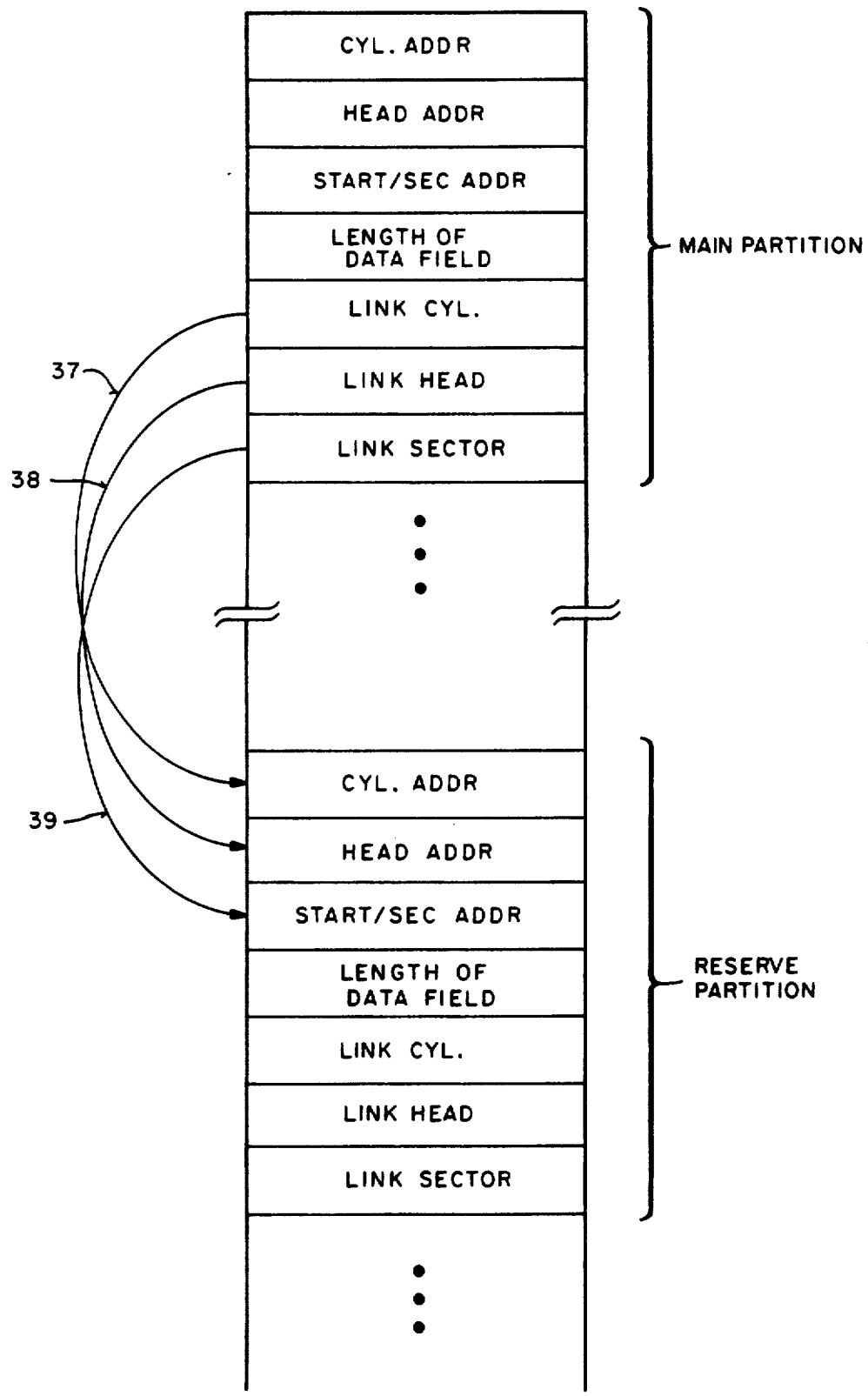
FIG_5

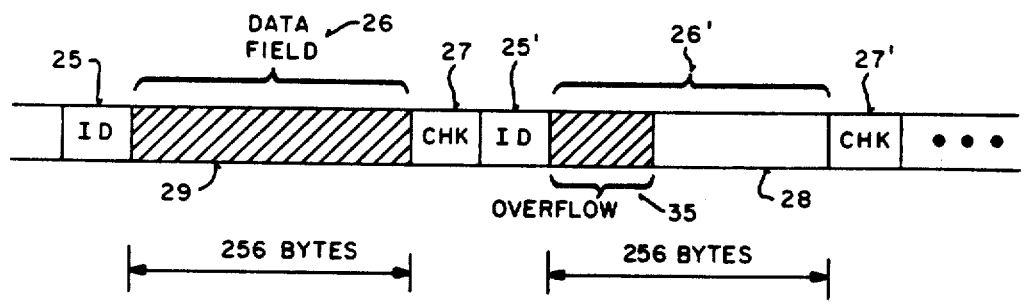
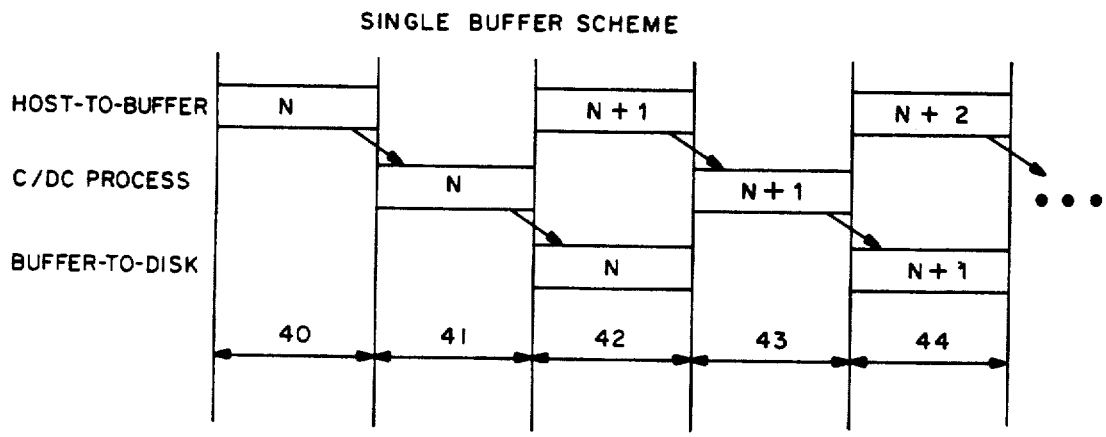
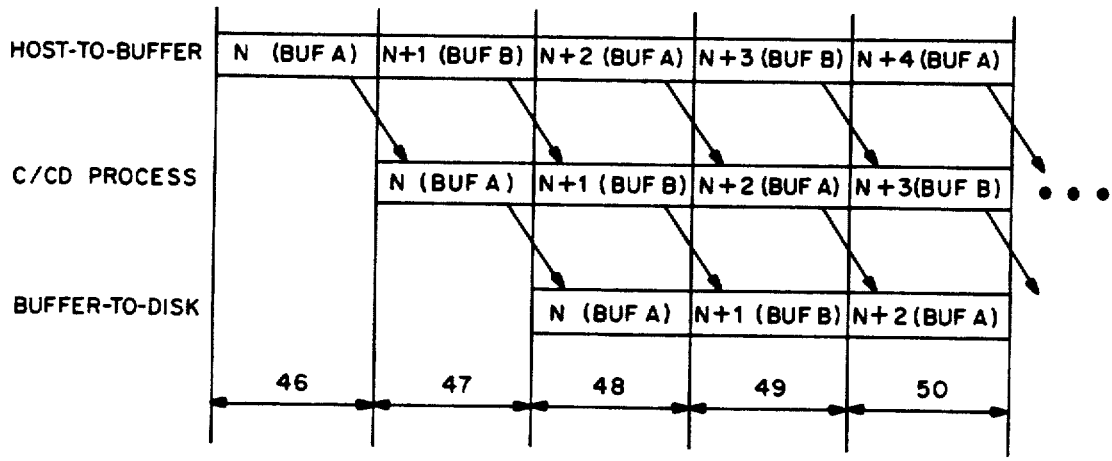

APPARATUS AND METHOD FOR EFFICIENT ORGANIZATION OF COMPRESSED DATA ON A HARD DISK UTILIZING AN ESTIMATED COMPRESSION FACTOR

This is a continuation of application Ser. No. 07/533,898, filed Jun. 4, 1990, now abandoned.

FIELD OF THE INVENTION

The present invention relates to the field of information storage on magnetic disk drives; more specifically, with ways of organizing compressed data onto a hard disk to increase the effective data density.

BACKGROUND OF THE INVENTION

Data compression is a branch of information theory in which the primary objective is to minimize the amount of data to be transmitted. As applied to rigid magnetic disks, the aim of data compression is to reduce redundancy in the stored or communicated data, thus increasing the effective data density on the storage medium. Ultimately, this means that more information can be stored using data compression algorithms than could be stored if compression techniques were unavailable. In this manner, compressing data to be stored or transmitted reduces storage and/or communication costs.

Because data compression involves transforming a string of characters in some representation (such as ASCII (American Standard Code for Information Interchange) code into a new string (e.g., of bits) that contains the same information but whose length is as small as possible, various problems arise. The most important of these is related to the fact that it is virtually impossible to predict a priori the size of a compressed data record. In other words, when a data compression algorithm operates on a string of data having a length of N-bytes, there is no way of deducing ahead of time what the size of the compressed data record will be. All that is known is that the compressed data string will be (CR*N) bytes long, where CR is the compression ratio (usually <1, however, in some instances the compression ratio may be >1 so that the compressed data requires more storage than the uncompressed data). Thus, the unpredictable nature of the compression/decompression process creates certain difficulties in storing large volumes of compressed data efficiently on a hard disk drive. This is especially the case when the disk has been preformatted with a fixed-length sector size. In prior approaches using a preformatted rigid-disk having fixed-length sector sizes (e.g., 512 bytes), there is usually a one-to-one correspondence between the number of bytes of a logical block and a physical sector on the disk. Storing compressed data for a 512-byte logical block in a 512-byte physical block would result in large portions of unused memory on the disk.

A computer hard disk is basically a three or four dimensional object. The track, or cylinder comprises the radial dimension of the disk, the number of heads (i.e., the sides of the disks) represents the vertical dimension; and the number of sectors within a track is the third, circular dimension. How much data can be stored inside each sector (i.e., the size of each sector) is the fourth dimension. Most often, a hard disk is physically formatted such that the available storage area is divided into a plurality of equal-sized regions. By way of example, most hard disks are divided into a fixed set of 512-byte sectors. Logical formatting, on the other hand, is essentially the adoption of a disk to the standards of the operating system. From a logical standpoint, the operating system treats the hard disk as a one-dimensional object and the sectors of the disk as a sequential list of logical block addresses. The logical formatting therefore is the road map that the operating system uses to read/write data information from/to the disk.

When compressed data is written to a hard disk, the smallest logical block size available for storing that information is dependent upon the physical formatting of the disk. In most instances, this means that the compressed data is stored into 512-byte large logical blocks. But since the compressed data is normally much smaller than a 512-byte block, this conventional method of storing compressed data results in inefficient use of disk space. Basically, relatively large portions of the hard disk go unused and are unavailable for further information storage. By way of example, for a compression ratio of 2:1, a 512-byte data string is compressed to a 256-byte string. When stored in the standard 512-byte logical block on a preformatted hard disk, the result is 256-bytes of wasted memory space.

What is needed then is a way of storing compressed data information onto a formatted hard disk more efficiently. As will be seen, the present invention provides a method of structuring the storage of compressed data on a hard disk in an embedded controller environment. The present invention is beneficial for increasing the storage capacity of a disk drive by utilizing the efficiency of compressed data, adding flexibility, and for enhancing the operating performance of the disk drive system. Moreover, the present invention allows management of the data compression/decompression to be performed transparent to the host processor such that no change need be made to the host operating system hardware or software.

SUMMARY OF THE INVENTION

An embedded controller disk-drive system including a microprocessor and a compression/decompression coprocessor is described. The described system enables the writing/reading of compressed/decompressed data having an arbitrary length to a rigid-disk drive in a more efficient manner. Furthermore, the present invention permits data to be compressed/decompressed transparent to the host such that no specialized changes need to be made to the host hardware or software.

According to one embodiment of the present invention, a compression factor most likely to result from the compression of a data string is first selected and is stored within the microprocessor. The compression factor most likely fixes the relationship between the number of bytes in a logical block and the number of bytes stored in the physical sector on the rigid-disk. Most rigid-disks are preformatted with a fixed sector length (e.g., 512-bytes).

Following the actual compression of the data string from an N-byte to an M-byte string (wherein M is normally <N), the microprocessor generates a specialized table containing descriptor field information associated with the compressed data string for each logical block. This descriptor field information contains a set of parameters indicating the particular physical block address where the compressed data string is to be stored as well as the length of the compressed data string. In the event that the compressed data string is larger than the physical block size available, the table also includes linking sector management information for linking the compressed data string between two or more physical blocks on the rigid-disk.

By way of example, during an overflow condition, compressed data must be stored across two or more separate physical block addresses. For such a situation the linking sector management information points to a new table entry (often located in a reserve partition of the table memory) which contains the appropriate descriptor field information indicating the particular physical block where the overflowed portion of the compressed data string is to be stored. Also included in the reserve table entry is the length of the overflow portion of the data string and any further linking information.

BRIEF DESCRIPTION OF THE DRAWINGS

The present invention is illustrated by way of example and not limitation in the figures of the accompanying drawings, in which like references indicate similar elements, and wherein:

FIG. 1 is a block diagram of the embedded controller data compression system of the present invention.

FIG. 2 illustrates the compression process activity on the data buffer bus shown in the embedded controller of FIG. 1.

FIG. 3 illustrates the data storage structure employed in the currently preferred embodiment of the present invention.

FIG. 4 shows the logical block address/head cylinder sector (LBA/HCS) table utilized in conjunction with the embedded controller system of the present invention.

FIG. 5 illustrates the LBA/HCS table of FIG. 4 further including main and reserve partitions.

FIG. 6 illustrates how the compressed data overflow is handled according to the presently preferred embodiment of the present invention.

FIG. 7 illustrates concurrent data transfer operation in the embedded controller of FIG. 1 for a single buffer scheme.

FIG. 8 illustrates concurrent transfer activity in the embedded controller of FIG. 1 for a dual buffer scheme.

DESCRIPTION OF THE PREFERRED EMBODIMENT(S)

An apparatus and method for efficient storage of compressed data on a magnetic disk drive system is described. In the following description, numerous specific details are set forth, such as device types, number of bits, attributes, etc., in order to provide a thorough understanding of the present invention. However it will be obvious to one skilled in the art that the present invention may be practiced without these specific details. In other instances, well-known elements have not been shown or described in detail in order to avoid unnecessarily obscuring the present invention.

With reference to FIG. 1, there is illustrated a block diagram of the embedded controller data compression circuit of the present invention. The embedded controller system comprises a compression/decompression coprocessor 10 coupled to two address/data buses 22A and 22B, a microprocessor 12, and a dictionary memory 11. Coprocessor 10 is a single integrated circuit designed for use in mass storage devices such as rigid disks. At present, an I/C-105 compression/decompression processor manufactured by InfoChip TM Systems, Inc., (Santa Clara, Calif.) is employed. The purpose of coprocessor 10 is to receive address and data information from microprocessor 12, compress the data in buffer 14A and/or 14B according to an adaptive data compression algorithm, and finally transmit the compressed data information back to data buffer 14A and/or 14B along the appropriate bus (i.e., either bus 22A or bus 22B).

Eventually, the compressed data is transferred from buffer 14 for storage on the rigid disk. This is coordinated by the buffer manager 19 embedded within integrated controller 18. Integrated controller 18 comprises a SH350 integrated circuit manufactured by Cirrus Logic, Inc., of Milpitas, Calif. The purpose of controller 18 is to manage the data transfers between the host central processing unit (CPU) (e.g., Small Computer Systems Interface (SCSI), data buffers 14A and 14B, microprocessor 12 and the rigid disk drive. This function is largely handled by the buffer manager 19 which also initiates a refresh (RFSH) cycle. Bus ownership for busses 22A and 22B is governed by bus arbitration units 17A, 17B and 17C. Control of these bus arbitration units is supplied along a control line coupled to microprocessor ($\mu$P) 12 (e.g., control line 21 coupled to arbitration unit 17A). Data bus 22A and data bus 22B are also shown having address and data lines coupled from microprocessor 12 directly to LBA/HCS table memory 15 through arbitration unit 17B. This allows direct communication between LBA/HCS table memory 15 and microprocessor 12.

In operation, coprocessor 10 employs a completely adaptive data compression algorithm which constructs a dictionary as data is processed by the coprocessor's internal compression engine. This dictionary is stored in a dedicated dictionary memory 11, which in the currently preferred embodiment comprises a 32-K $\times$ 8 memory. During decompression, that is the process in which compressed data residing in buffer 14 is retranslated back into its original form, the dictionary is reconstructed simultaneously with the data decoding. Although actual compression effectiveness is data dependent, file size reductions of 2-8 times are typically achieved using the embedded controller system of FIG. 1.

Compression/decompression coprocessor 10 relies upon an adaptive compression algorithm commonly referred to as the Lempel-Ziv algorithm. To better understand the operation of coprocessor 10 and the Lempel-Ziv algorithm, consider the following example.

Assume that an uncompressed data string a b a b c b a is input to coprocessor 10 for compression. To encode this input string, coprocessor 10 begins by parsing the input string into indexed substring elements as shown in Table I below. This information, along with the coded data is entered into dictionary memory 11 sequentially.

TABLE I

| Index | Parsed Substring | Code |
|---|---|---|
| 1 | a | o,a |
| 2 | b | o,b |
| 3 | ab | 1,b |
| 4 | c | o,c |
| 5 | ba | 2,a |

By way of example, the first parsed substring element is the character a. The character a is given an index of 1 and is coded as o, a as shown in Table I. According to the Lempel-Zil algorithm, the integer value represents the index number in the dictionary while the character is the last character in the parsed substring. Thus, each indexed parsed substring element can be represented by an N-bit code which is stored in dictionary memory 11.

Continuing with the remainder of the input string, the second character b is fetched, and as no preceeding parsed substring has this character, it is assigned an index value of 2 and is coded as o, b. Continuing with the input string, the next character a is fetched. In as much as the character a has previously been parsed (i.e., index 1) there is no output code and the next character in the string is fetched; character b. The input string is now a b and as this has not been previously parsed, that string is encoded as 1, b. The number 1 indicates the index for a previously parsed substring, while the last character in the substring is the character b. Similarly, the rest of the input characters are parsed as shown by entries 4 and 5. It is appreciated by practitioners in the art that larger input strings result in more redundancy, thereby increasing the compressibility of the data information.

Decompression involves the same process only in the reverse order. That is, previously coded information is read into coprocessor 10 which then regenerates a dictionary (e.g., such as that depicted in Table I) and utilizes it to reconstruct the original data string.

Normally, each of the data buffers 14A and 14B are partitioned into two distinct sections: the first section holding previously compressed data bytes, and the second, storing data that is next to be compressed. By virtue of the look aside architecture, microprocessor 12 needs to be heavily involved in the compression/decompression process. For example, microprocessor 12 may initiate a compression cycle on a data block by passing the data information through coprocessor 10 onto data bus 22A and 22B for storage in the portion of the data buffer reserved for uncompressed data. Coprocessor 10 then begins the compression process on a byte-by-byte basis. Ideally, the reading of uncompressed data and writing compressed (i.e., coded data) back to data buffer 14 occurs concurrently. This operation is illustrated in FIG. 2.

In a more general case, multiple data buffers 14A and 14B may be employed (along with additional arbitration units 17A through 17C) to allow concurrent writing to any source (i.e., communication between buffers 14A and 14B and controller 18 concurrent with the compression/decompression process). For such a situation, a read or write may be performed from the host or to the disk from buffers 14A and 14B simultaneous with the process of FIG. 2.

In FIG. 2, during a first time period T, a byte N is read from one section of data buffer 14 by coprocessor 10. Note that when byte N is read, it is in an uncompressed format. Coprocessor 10 then begins to generate the code for byte N. To maximize efficiency, the coprocessor writes previously encoded data back to buffer memory 14. If necessary, the coprocessor 10 reads the next data byte N+1 from buffer 14. In order to generate this code word these read and write cycles are timed to occur within an interval T, and if the compression/decompression process falls within a time period 2T, then coprocessor 10 may write the coded byte N to data buffer 14 at the same time that it starts to generate the coded for byte N+1. Thus, reading and writing of uncoded and coded data information to and from data buffer 14 takes place concurrently with the compression process to maximize data through-put.

According to the present invention, compressed data density is increased by altering the fundamental relationship between logical blocks and physical sectors on the rigid disk to thereby avoid inefficiencies in data storage. It achieves this by way of LBA/HCS table 15. Table 15 provides a way of associating, for every logical block of information, descriptive parameters—not only where the data is to be physically stored on the hard disk, e.g., the head, cylinder and sector (HCS) locations, but also the actual length of the data present and any linking attributes that might be needed to associate multiple physical sectors to a logical block. In essence, table 15 changes the nature of the directory format controlling how information is stored and retrieved to/from the rigid disk drive. Before the logical block descriptor information can be stored into table 15, the relationship between the number of bytes that are to be contained in a logical block and the number of bytes in a physical sector size must be determined. This is determined by choosing/setting the compression factor most likely ($CF_{ML}$) and storing this information in the microprocessor 12. The compression factor most likely is the best estimate of the average or typical size of compressed data in relation to the uncompressed data. For instance, if the original logical block were 512-bytes long and the compressed data usually ended up being approximately 256-bytes, then the user would set $CF_{ML}=2:1$.

It is important to recognize that typically the $CF_{ML}$ figure defines the relationship between the number of physical sectors that will be used to store the compressed data associated with a single logical block onto a preformatted hard disk having fixed sector lengths. Consider the example shown in FIG. 3. In FIG. 3, a 512-byte uncompressed logical block has been compressed by processor 10 down to 200-bytes in length. The example of FIG. 3, assumes a $CF_{ML}$ of 2:1 so that for a logical block size of 512-bytes, the physical sector size is 512 divided by two, or 256-bytes. Thus, the 200-bytes of compressed data would fit within this 256-byte sector data field. Each physical sector contains an identification field 25, a data field 26, and a check field 27. The compressed data is written into data field 26 as shown by the cross-hatched region 29. The unused portion of data field 26 is indicated by region 28. The next logical block of compressed data may be stored in the next physical sector of the disk denoted by identification field 25', data field 26', and check field 27'.

Traditionally, the number of data bytes in a physical sector is equal to the number of data bytes in a logical block. By way of example, for a logical block of 512-bytes, the physical sector size would also be 512-bytes long. If the aforementioned 200-bytes of compressed data were to be stored in this 512-bytes physical sector, more unused storage space would result. This additional unused storage space decreases the storage inefficiency, and is the motivating reason for making this physical sector smaller.

Assuming a $CF_{ML}$ of 2:1, note that the amount of logical data that can be stored on a track is increased by the same factor (i.e., by a factor of 2). This means that for a compression factor of 2:1, a logical track of data can now be stored in one-half the physical space. In other words, for the example discussed above, the disk volume now contains twice as much logical data. Theoretically, the increase in logical data storage is a direct function of the compression factor most likely to occur. This extra capacity is made available to the host system, except for a portion used as a reserved area to manage those logical blocks that do not compress to fit within a physical sector. All that remains is a way of keeping track of the number and location of the physical sectors associated with each logical block and the amount of compressed data in each physical sector. This is the function of LBA/HCS table 15.

With reference to FIG. 4, an example of the type of descriptive parameters stored within LBA/HCS table 15 according to the currently preferred embodiment, is illustrated. Entered into the first table entry location is the start cylinder address, which in the presently preferred embodiment is 2-bytes in length. In general, the number of bytes that must be reserved for the start cylinder address, start head address, start sector address, etc., entries in LBA/HCS table 15 is a function of the parameters of the physical disk drive machine. This means that the number of bytes needed to describe the HCS information associated with the logical block is dependent on the actual number of head, cylinders and sectors associated with the physical disk drive.

The first three entries of the LBA/HCS table hold the HCS information which indicates where the compressed data is to be stored on the disk drive. The fourth table entry contains the length of the data field. By way of example, for the data field length used in the example of FIG. 3, the fourth table entry would contain the binary code for decimal 200. It is important to store the data field length since the microprocessor must be able to differentiate relevant data from the vacant storage locations within a physical sector. Without this information, the microprocessor performing a read operation would be unable to determine what was uncompressed data and what is simply unused storage area. Table entries 5, 6 and 7 provide linking information which are used in the event that the compressed data does not fit within the physical sector size assigned to it. For instance, if the compressed data in the example of FIG. 3 were larger than 256-bytes in length (e.g., 300-bytes), then an additional physical block address would be needed to be designated for storage of the overflow information. This situation is explained in more detail below. In the event that the compressed data fits within the data field defined by the selection of the compression ratio most likely, then 0's are simply stored in table entry locations 5, 6 and 7. Anything other than a 0 in these table entry locations indicates that an overflow condition has occurred.

It should be appreciated that the length of the LBA/HCS table entries associated with a logical block is somewhat variable in length, in other words, additional descriptive parameters may be stored along with the basic essential information described above. For example, in FIG. 4, table entry 8 indicates a housekeeping entry which may be used for instance to indicate whether the data stored at a particular logical block is compressed or decompressed. In other applications, the housekeeping entry may be used to indicate certain defect information. Theoretically, there is no limit to the amount of additional parametric information that may be associated with a particular logical block. In so much as the LBA/HCS table can be very large (e.g., approximately 7.8 megabytes in the preferred embodiment) the architecture shown in FIG. 1 allows for a compressed version of the table to be stored in memory on an accrual bases. In other words, the LBA/HCS table generated by microprocessor 12 for managing the compressed data may itself be compressed to reduce the size of memory 15. Thus, by compressing the LBA/HCS table information, fewer memory parts are required. The attendant decrease in printed circuit board power and space can result in significant cost savings.

With reference back to FIG. 1, consider once again the operation of the embedded controller for a typical compression cycle. For purposes of this example, assume that a compression factor most likely of 2:1 is chosen and stored in microprocessor 12. Compression then proceeds in coprocessor 10 which reduces the data from an original uncompressed N-bytes stored in data buffers 14A and 14B to a compressed length of M-bytes again stored in buffers 14A and 14B. It is important to recognize that M may be greater than or less than N. Of course, under most circumstances M will be <N since the compression algorithm takes advantage of redundancy in the data. That is, highly redundant data will be greatly compressed.

After the compression cycle is complete, coprocessor 10 signifies that it is finished by sending an interrupt to microprocessor 12. At this point, microprocessor 12 reads the status of the compression/decompression chip and determines the length of the compressed data. The microprocessor then generates particular descriptor field information for the M-bytes of compressed data and enters that information in the table entries associated with the relevant logical block. By this process, the microprocessor has stored in table 15, the information it needs to manage the compressed data. After the LBA/HCS table entries for a particular logical block have been written, microprocessor 12 gives controller chip 18 the information it requires for writing the compressed data to the rigid disk.

As mentioned above, the present invention utilizes a linking sector management scheme for handling situations in which compressed data for a logical block does not fit within a physical sector on the disk. This would occur whenever the compressed data length exceeds the users best estimate of the compression factor (i.e., the compression factor most likely). To handle these "overflow" situations, the present invention employs reserve partitions in LBA/HCS table 15 and on the physical hard disk. This situation is depicted in FIG. 5. In FIG. 5, arrows 37, 38 and 39 point to cylinder, head, sector address locations, respectively, located in the reserve table partition. Thus, the reserve table partition entries linked from/to the main partition denote the location and length of the overflow portion of compressed data written to the rigid disk. This overflow data is normally written to a reserved partition of the disk itself. Note that the reserve partition table entries, themselves, can also contain a link sector management information. This means that if the overflow compressed data itself exceeds the physical sector size, that the overflow will be extended to another physical sector. In other words, the linking process can continue until the reserved portion has been fully used.

FIG. 6 shows a situation in which a compression factor most likely of 2:1 is selected and the compressed data overflows into another physical sector. (Note that in FIG. 6, the overflow is shown in data field location 26', which immediately follows data field 26. As explained above, in most cases this overflow information will be stored in a reserve partition of the rigid disk rather than in the next physical sector.) In FIG. 6, data field 26 associated with a logical block is completely filled, as shown by cross-hatched region 29. For this situation, the LBA/HCS table entry for this logical block would have linking information which would point to the head, cylinder, sector associated with overflow data portion 35.

To better appreciate the differences between the single data buffer and dual data buffer schemes, consider the example provided in FIGS. 7 and 8. In FIG. 7, a single data buffer scheme is illustrated in which two data transfers may occur concurrently. In FIG. 7, transfers and/or compression/decompression (C/DC) processing occur in time intervals 40 through 44. By way of example, at time interval 40, a logical block N of uncompressed data is transferred from the host to buffer 14 along bus 22. Next, coprocessor 10 operates on logical block N to compress the data. This occurs during time interval 41. At time interval 42, buffer manager 19 again assumes ownership of bus 22 such that the next logical block of data N+1 is transferred from the host to data buffer 14 concurrent with a transfer of the compressed data for logical block N from buffer 14 to the rigid-disk. At time interval 43, coprocessor 10 assumes ownership of the bus and compresses the data associated with logical block N+1. At time interval 44, two concurrent transfers again occur: a host to buffer transfer of the next logical block sequence (i.e., logical block N+2), and a buffer to disk transfer of the compressed data for logical block N+1. Note that during time intervals 40, 42 and 44 buffer manager 19 has ownership of bus 22, while in intervals 41 and 43, coprocessor 10 assumes control of bus 22.

In the dual data buffer scheme of FIG. 8, three concurrent transfers may occur. In the dual buffer scheme of FIG. 8, two data buffers (e.g., data buffer A and data buffer B) are required along with two address and data busses associated with each of data buffers 14A and 14B.

At time interval 46, a logical block N of uncompressed data is transferred from host to data buffer A. Next, at time interval 47, the compression process commences on logical block N by using the bus associated with buffer A. Concurrent with this operation is the next logical block transfer, (i.e., N+1), from the host to buffer B. At time interval 48, three concurrent processes are taking place: a host to data buffer A transfer of an uncompressed logical block data N+2, a compression process operating on a logical block N+1, previously stored in buffer B, and a buffer to disk transfer on the compressed data associated with logical block N. Note that the three concurrent transfers are made possible by the use of dual buffers and dual data/address buses. This concurrency continues in time intervals 49 and 50 and beyond.

It will be appreciated by practitioners in the art that the apparatus and method of the present invention has very little overhead in terms of access to logical descriptor information. It can be shown that the access method for the logical block to head, cylinder, sector conversion has a constant modulo N relationship, where N is equal to the number of entries in the LBA/HCS table associated with a particular logical block.

Whereas many alternations and modifications of the present invention will no doubt become apparent to a person of ordinary skill in the art after having read the foregoing description, it is to be understood that the particular embodiments shown and described by way of illustration are in no way intended to be considered limiting. For example, in alternative embodiments, the LBA/HCS table entries may contain additional or different information. In other instances, the embedded controller system of the present invention may be tailored or altered according to specific applications or system requirements. Therefore, reference to the details of the preferred embodiment are not intended to limit the scope of the claims which themselves recite only those features regarded as essential to the invention.

I claim:

1. A method of storing a logical block on a rigid-disk in a disk drive system by compressing said logical block prior to writing said logical block on said rigid-disk, resulting in a compressed logical block, wherein the compressed logical block can later be read, decompressed, and reconstructed, and wherein said method is transparent to a host computer coupled to said disk drive system, said method comprising the steps of:

selecting a compression factor based on an estimated ratio of a size of said logical block before said logical block has been compressed to an average size of said logical block after said logical block has been compressed;

formatting said rigid-disk with fixed sector lengths, said fixed sector lengths based on said compression factor;

compressing said logical block according to a compression algorithm;

generating a table containing descriptor field information associated with said compressed logical block, said descriptor field information containing a set of parameters which indicate a physical location where said compressed logical block is to be stored along with a length of said compressed logical block, said table generated by a processor; and writing the compressed logical block on said rigid-disk.

2. The method of claim 1 wherein said set of parameters includes a head, cylinder and sector of said logical block.

3. The method of claim 2 wherein if said length of said compressed logical block exceeds said fixed sector lengths, said set of parameters further includes linking sector management information for describing a sector location where overflow of said compressed logical block is stored.

4. The method of claim 3 wherein said fixed sector lengths are comprised of 256-bytes.

5. In an embedded controller disk-drive system including a microprocessor and a compression/decompression coprocessor, a method of writing a compressed logical block to a rigid-disk physically formatted with fixed sector lengths, which is transparent to a host computer system coupled to said disk-drive system and wherein said compressed logical block can later be decompressed and reconstructed, said method comprising the steps of:

selecting a compression factor based on an estimated ratio of a size of a logical block before said logical block has been compressed to an average size of said logical block after said logical block has been compressed;

setting said fixed sector lengths as a function of said compression factor;

compressing said logical block from N-bytes to said compressed logical block using said compression/decompression coprocessor, said compressed logical block having M-bytes;

transferring said M-bytes of said compressed logical block to a buffer memory;

determining a length of said M-bytes of said compressed logical block;

entering descriptor field information into a table associated with said compressed logical block, said descriptor field information indicating a physical head, cylinder and sector where said M-bytes of said compressed logical block are to be stored, as well as the length of said M-bytes of said compressed logical block.

6. The method of claim 5 wherein if said length of M-bytes of said compressed logical block exceeds said fixed sector lengths, said descriptor field information further comprises linking sector management information for describing a sector location where overflow of said compressed logical block is stored.

7. The method of claim 6 wherein said table is accessed by a K-byte read of said microprocessor, wherein K is a number of bytes in said table associated with said descriptor field information for said compressed logical block.

8. The method of claim 7 wherein each of said fixed sector lengths of said rigid disk is comprised of 256-bytes.

9. An embedded controller system for writing a compressed logical block to a rigid-disk for storage thereon, reading said compressed logical block from the rigid-disk, and decompressing the compressed logical block read from the rigid-disk, and wherein said controller system is transparent to a host system of the embedded controller system, comprising:

a compression and decompression means for compressing a logical block, resulting in said compressed logical block, according to a compression algorithm and later decompressing the compressed logical block according to a decompression algorithm so that said logical block is reconstructed;

a buffer memory means for storing said logical block;

a microprocessor means for transferring said logical block from said buffer memory means to said compression and decompression means and for receiving information from said compression and decompression means corresponding to a length of said compressed logical block resulting from compression of said logical block by said compression and decompression means, said microprocessor means also storing a compression factor which is based on a ratio of a size of said logical block before said logical block has been compressed to an average size of said logical block after said logical block has been compressed, wherein a physically formatted fixed sector length of said rigid-disk is specified by said compression factor;

a table memory means for storing descriptor field information associated with said compressed logical block which indicates a sector of said rigid-disk where said compressed logical block is to be stored and a length of said compressed logical block;

controller means for transferring said compressed logical block from said buffer memory means to said rigid-disk.

10. The system of claim 9 wherein said descriptor field information comprises head, cylinder and sector information associated with said compressed logical block.

11. The system of claim 10 wherein if said compressed logical block has a length exceeding said physically formatted fixed sector length, said descriptor field information further comprises linking sector management information for describing a sector location where overflow of said compressed logical block is stored.

12. The system of claim 11 wherein said fixed sector length comprises 256-bytes.

* * * * *